United States Patent [19]
Howald

[11] Patent Number: 6,153,667
[45] Date of Patent: Nov. 28, 2000

[54] HOT MELT INK

[75] Inventor: Nicole Howald, Jona, Switzerland

[73] Assignee: Pelikan Produktions, AG, Zurich, Switzerland

[21] Appl. No.: 09/235,109

[22] Filed: Jan. 21, 1999

Related U.S. Application Data

[63] Continuation-in-part of application No. 08/960,398, Oct. 29, 1997, abandoned.

[30] Foreign Application Priority Data

Oct. 31, 1996 [EP] European Pat. Off. .............. 96810724

[51] Int. Cl.$^7$ ................... C09D 11/10; C08F 210/14; C08F 226/10; C08L 23/18; C08L 39/06

[52] U.S. Cl. .............. 523/160; 526/348.2; 526/348.3; 526/348.4; 526/348.5; 526/264; 524/579

[58] Field of Search .................................. 523/160, 161; 526/264, 348.2, 348.3, 348.4, 348.5; 524/270, 548, 579; 106/31.3, 31.62

[56] References Cited

U.S. PATENT DOCUMENTS

| | | | |
|---|---|---|---|
| 3,423,381 | 1/1969 | Clark et al. .......................... | 526/211 |
| 3,542,682 | 11/1970 | Mutaffis ............................... | 430/115 |
| 3,935,144 | 1/1976 | Hagenweiler et al. ............. | 525/54.45 |
| 4,536,405 | 8/1985 | Nara et al. . | |
| 4,889,560 | 12/1989 | Jaeger et al. . | |
| 5,122,187 | 6/1992 | Schwarz et al. . | |
| 5,151,120 | 9/1992 | You et al. . | |
| 5,185,170 | 2/1993 | Kopolow . | |
| 5,397,388 | 3/1995 | Fujioka ............................... | 106/31.29 |
| 5,405,438 | 4/1995 | Fujioka . | |
| 5,514,209 | 5/1996 | Larson, Jr. . | |
| 5,531,819 | 7/1996 | Sawada . | |
| 5,593,486 | 1/1997 | Oliver et al. . | |
| 5,621,022 | 4/1997 | Jaeger et al. . | |
| 5,973,027 | 10/1999 | Howald et al. .................... | 523/160 |

FOREIGN PATENT DOCUMENTS

| | | |
|---|---|---|
| 0353979 A2 | 2/1990 | European Pat. Off. . |
| 0610090 A1 | 8/1994 | European Pat. Off. . |
| 0105994 A1 | 4/1996 | European Pat. Off. . |
| 1209791 | 10/1970 | United Kingdom . |
| WO 91/18065 | 11/1991 | WIPO . |

OTHER PUBLICATIONS

Alger, Mark; Polymer Science Dictionary 2nd Ed., Chapman and Hall, London (p. 526) 1989.

Lewis Sr., Richard J.; Hawley's Condensed Chemical Dictionary 12th Ed., Van Nostrand Reinhold Company, New York (p. 871) 1989.

Database WPI, Section Ch, Week 7709, Derwent Publications Ltd., London, GB class A82, AN 77–15308Y, XP002028366 & JP 52 006 207 A, Jan. 18, 1977.

*Primary Examiner*—Edward J. Cain
*Assistant Examiner*—Callie E. Shosho
*Attorney, Agent, or Firm*—Fay, Sharpe, Fagan, Minnich & McKee, LLP

[57] ABSTRACT

The present invention comprises an abrasion-resistant and blocking-resistant hot melt ink, which can be printed at a temperature of approximately 80° C. to 100° C. which includes an adhesion-facilitating substance, a viscosity-facilitating substance and a copolymer of polyvinyl pyrrolidone with one or several long-chain α-olefins with at least 10 carbon atoms. The ink has excellent adhesion properties with respect to the imprintable material or printing substrate, and withstands normal handling such as folding or bending. Additionally, the present invention includes colored hot melt inks that exhibit improved transparency properties even if the inks are formulated for printing at low temperatures.

18 Claims, No Drawings

HOT MELT INK

CROSS REFERENCES TO RELATED APPLICATIONS

This application is a continuation-in-part of U.S. Ser. No. 08/960,398, filed Oct. 29, 1997, abandoned; which claims priority under 35 U.S.C. § 119 of German Application No. 96810724.3 filed Oct. 31, 1996.

FIELD OF THE INVENTION

The present invention relates to hot melt ink compositions for ink jet printers, and more specifically to abrasion-resistant and blocking-resistant inks for piezo printers.

BACKGROUND OF THE INVENTION

At room temperature, hot melt inks are generally in solid form. Upon exposure to the relatively high operating temperatures of an ink jet printer, hot melt inks liquefy. During application, minute ink droplets are sprayed onto paper or other similar material and immediately solidify upon impact with the printing substrate. Hot melt inks are beneficial since they exist in solid phase at room temperature, for example during transport or storage. Since the ink droplets, which are typically colored, instantly solidify upon impact with the material undergoing printing, running of the ink is precluded, which increases the quality of the print.

Previously employed hot melt inks are typically formulated for use at high printing temperatures, i.e. temperatures between 100 and 140° C. Such high printing temperatures require high operating temperatures for the printing devices. High printing temperatures place high demands upon electronic components used in the printing devices. Accordingly, the life expectancy of such printing devices is not very long as a result of these extreme demands.

Low temperature hot melt inks have been developed. However, these inks exhibit low abrasion resistance and/or low adhesion to the printing substrate. Frequently, these inks separate from the printed material with normal handling such as bending or folding of the material. Furthermore, if the printed material is stored at temperatures which are only slightly above normal or ambient temperatures, the ink frequently sticks, for instance in the case of freshly printed paper, to the reverse side of the page on top.

Another, previously unsolved, problem is the relatively low transparency of colored hot melt inks during overhead projection of the printed material. Inks having poor transparency properties do not project vivid colors when used with overhead projection transparencies, for example. This problem is even more pronounced for low temperature hot melt inks. With low printing temperatures, the viscosity of the ink must be reduced. Lower viscosity is attained through increased addition of, for example, paraffin. Higher paraffin content, however, results in lower transparency of the resulting ink.

SUMMARY OF THE INVENTION

The object of the present invention is to provide an abrasion-resistant and blocking-resistant hot melt ink for piezo printers, which is printable at a temperature of approximately 80 to 100° C. The ink must adhere well to the printing substrate and stand up to normal handling, i.e. folding or bending of the printed material. Another aim of the present invention is to provide colored hot melt inks that exhibit improved transparency properties, and particularly hot melt inks that can be printed at relatively low temperatures yet which are relatively transparent thereby enabling the projection of vivid colors during overhead projection applications, for instance.

The above object of the invention is solved by an abrasion-resistant and blocking-resistant hot melt ink adapted for ink jet printers, said hot melt ink comprising a substance, solid at a room temperature, having a melting point in the range from about 30 to about 100° C., which imparts abrasion-resistance and scratch-resistance characteristics to said hot melt ink and being a copolymer of vinyl-pyrrolidone with one or several long-chain α-olefins with at least 10 carbon atoms; an adhesion-facilitating substance having a melting point of up to about 100° C.; and a viscosity-facilitating substance with a melting point of up to about 100° C.

DETAILED DESCRIPTION OF THE PREFERRED EMBODIMENTS

The ink according to the invention contains a copolymer of vinyl-pyrrolidone with one or several long-chain α-olefins with at least 10 carbon atoms. Preferred is the range from 15 to 40 carbon atoms, specifically 19 to 35 carbon atoms. Copolymers of this type are also called alkylated vinyl-pyrrolidone polymers or alkylated PVP. They are obtained via copolymerization of vinyl-pyrrolidone and long-chain α-olefins. Aside from the formation of linear copolymers of the heterocyclic monomer and the long-chain α-olefins, an insertion occurs of long-chain alkyl groups into the vinyl-pyrrolidone structure.

Preferred copolymers are obtained by copolymerization of vinyl-pyrrolidone with α-olefins having 15 to 40 carbon atoms. One preferred example of a long chain α-olefin is eicosene. Preferred copolymers have an average molecular weight (determined by high-velocity membrane osmometer) of approximately 5,000 to 12,000, specifically approximately 7,000 to 10,000. Furthermore, it is preferred that the copolymer has a melt range of below room temperature to approximately 80° C., specifically of below room temperature to approximately 40° C. The copolymer is preferably largely dissolved in the solvent.

The most preferred copolymer is poly(1-ethenylpyrrolidon-2-on/triacont-1-en). This preferred copolymer has a melting point of 56–68° C., in particular about 63° C., is generally insoluble in water, mixable with organic solutions and has a white color when solid at 20° C. The preferred copolymer has the following structure:

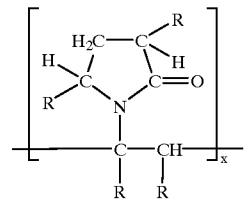

R may be either hydrogen or an alkyl group.

By means of variation of the molecular weight of the alkyl groups and the weight ratio of α-olefin to vinyl-pyrrolidone, one obtains a plurality of polymers with different properties. The copolymers are non-poisonous and toxicologically harmless.

The above copolymer should, moreover, serve as a dispersion medium for the pigments and as a solvent for the dyes, described in greater detail below. This substance is preferably employed in a proportion of from about 10% to about 75% in the ink composition (all percentages are percentages by weight).

The adhesion-facilitating substance employed in the present invention can be in liquid or solid phase. This substance preferably has a melting point of up to about 100° C. In comparison with the at room temperature solid substance, it should be elastic and highly viscous, and should have a relatively high polarity. The adhesion-facilitating substance can be mixed with the at room temperature solid substance and serves, furthermore, for dispersing the pigments in the ink. If dyes are used, the substance serving as the adhesion-facilitating substance increases the solubility of the dye and the solid substance. The adhesion-facilitating substance is preferably employed in a proportion of 4% to 30% in the ink composition.

The function of the adhesion-facilitating substance is to provide flexibility and adhesion of the hot melt ink on the paper or printing substrate. Preferably employed as adhesion-facilitating substances in the present invention are tacky, low-softening point resins with excellent pigment-wetting characteristics. They have good color retention and preferably softening point (according to Hercules drop method) of about 55 to 75° C., in particular about 60 to 70° C. They are soluble in ester, ketones, higher alcohols, however insoluble in water, methanol, ethanol and ethylene glycol. They have a wide compatibility with natural and synthetic polymers. The most preferred adhesion-facilitating substance is a phthalate ester of (technical) hydroabietyl alcohol. This most preferred ester is a pale, tacky, low-softening point resin. An example of a further commercially available adhesion-facilitating substance is Foral 85, which is an ester of a hydrogenated rosin and which is available from Hercules.

The present invention hot melt ink composition also comprises a viscosity-facilitating substance which simultaneously serves as a carrier substance for the other ingredients. The viscosity-facilitating substance is preferably present as a hydrophobic oil or as a wax or wax-like substance with a melting point of up to about 100° C. In particular are included waxes and wax-like substances which are characterized having the following properties: ductile and kneadable at 20° C., but firm to brittle; fine to coarse crystalline, translucent to opaque but not glassy; can be heated over 40° C. without decomposition and not ropy or stringly. This is a typical wax definition (Roempp Chemie Lexikon, 9th edition, vol. 6, 1992, p. 4972). Examples of suitable wax-like materials include paraffin waxes, silicones, natural waxes such as bees wax, carnauba wax, and ozocerite. Synthetic waxes are also suitable, especially acid waxes, ester waxes, partially saponified ester waxes, and polyethylene waxes. The amount of the viscosity-facilitating substance utilized in the hot melt ink composition depends upon the desired printing temperature. Generally, the higher the anticipated temperature for printing, the lesser the amount of the viscosity-facilitating substance utilized. Conversely, the lower the anticipated temperature for printing, the greater the amount of the viscosity-facilitating substance utilized. A viscosity in the range of 10 to 30 mPas/s is desirable for the preferred embodiment hot melt ink. The viscosity-facilitating substance is preferably employed in a proportion of from about 10% to 75% in the ink composition. Preferred viscosity-facilitating substances are low molecular weight waxes, more preferred are petroleum waxes, and most preferred is paraffin. It is also contemplated that various fatty acids, fatty alcohol, and fatty amines could be utilized in combination with, or instead of, the noted waxes for the viscosity-facilitating substance.

The hot melt inks of the present invention also comprise pigments and\or dyes, which are present in the mixture of the at room temperature solid wax, the adhesion-facilitating substance and the viscosity- facilitating substance, in finely dispersed or dissolved form. Preferred dyes are, for yellow—Solvent Yellow 162; for red—Dispers Red 60; for blue—Solvent Blue 63 and for black—Solvent Black 3. Preferred pigments are for yellow—Pigment Yellow 127; for red—Pigment Red 122; for blue—Pigment blue 15:3 and for black—carbon black. These preferred pigments are those which are identified as organic pigments in "The Colour Index, Bradford: Society of Dyers and Colourists, 1971, 1975 (see Roempp Chemie Lexikon, 9th edition, vol. 2, 1990, p. 780).

The particle size of the dispersed pigment ranges preferably between approximately 5 and 500 nm, specifically between approximately 5 and 300 nm. It is, moreover, preferred, that the specific weight of the pigment be close to that of the melted ink, since this results in further improvement of the ink with resepct to formation of sediment. The employable amount of pigment largely depends upon its type, in general it ranges from approximately 2 to 25% by weight relative to the ink and specifically between 5 to 15% by weight. The amount of the dye ranges preferably from approximately 0.2 to 7%, preferably 0.5 to 5% by weight.

A preferred hot melt ink composition in accordance with the present invention comprises 10 to 75% by weight Paraffin 10809; 4 to 30% by weight phthalate ester of hydroabietyl alcohol; 10 to 75% by weight Poly(1-ethenylpyrrolidon-2-on/triacont-1-en); and either (i) 12 to 20% by weight of one or more pigments, and (ii) 0.5 to 5% by weight of one or more dyes. Another preferred hot melt ink composition comprises about 64% by weight Paraffin 10809; about 15% by weight phthalate ester of hydroabietyl alcohol; about 21% by weight Poly(1-ethenylpyrrolidon-2-on/triacont-1-en); and at least one of (i) 1 to 3% by weight dyes, and (ii) 3 to 15% by weight pigments.

The preferred embodiment hot melt inks of the present invention have a melting point in the range of from 80 to 100° C. and most preferably from 50 to 90° C.

The ink according to the invention has a comparatively low melting point and has, despite the low melting temperature, excellent adhesion properties, i.e. it is scratch-resistant and blocking-resistant and withstands folding and bending of the printed paper without separating from same. The term "blocking-resistant" as used herein refers to a characteristic of the inks of the present invention wherein freshly printed paper sheets or sheets of any other freshly printed materials can be stacked on one another without sticking. In addition, the hot-melt ink according to the invention may be brilliantly colored, is water-proof, and demonstrates these properties with respect to all imprintable materials.

The present invention hot melt inks are preferably prepared as follows. All components are melted and stirred, or otherwise mixed, until a generally homogenous batch or mixture is obtained. In the event that one or more pigments are utilized, it is preferred that they be dispersed in a heated mill. The pigments are then preferably added to the homogenous batch. A wide array of shapes and configurations may then be formed from the hot melt ink composition. One such preferred article is a solid wax pencil, and particularly those that are utilized in printers.

EXAMPLES

An ink composition according to the present invention was prepared as follows:

The preferred at room temperature solid substance used in the present invention hot melt ink composition, which imparts to the ink its abrasion- and scratch-resistance characteristics, was a co-polymer of polyvinylpyrrolidone and long chain alpha-olefins (Antaron™ WP 660, manufactured by ISG Global Technologies GmbH, Frechen, Germany). The employed adhesion-facilitating substance was a phthalate ester of hydroabietyl alcohol (Cellolyn™ 21-E synthetic resin, manufactured by Hercules, Rijswijk, Netherlands). For adjustment of the viscosity, a petroleum wax (softening point 60–62° C. according DIN-ISO 2207) (manufactured by DEA, Hamburg, Germany) was used.

The employed dyes were solvent yellow 162 (Neopen yellow 075, manufactured by BASF, Germany) Dispers Red 60 (Neopen Magenta SE 1443, manufactured by BASF, Germany), Solvent Blue 63 (Kayaset Blue 714, manufactured by Nippon Kayaku Co., Ltd., Japan) and Solvent Black 3 (Orient Oil Black 860, manufactured by Orient Chemicals Inds., Ltd., Japan). Employed as pigments were Pigment Yellow 127, (Permanent Yellow GRL 01, manufactured by Hoeschst, Germany), Pigment Red 122, (Hostaperm Rosa EB transp. by Hoeschst, Pigment Blue 15:3 (Heliogenblue 7084, manufactured by BASF, Germany) and Carbon Black (Monarch 880, manufactured by Cabot Corporation USA).

For a hot melt ink, to be printed out at 80° C., in accordance with the invention the following proportions were used:

| | |
|---|---|
| Petroleum wax | 63% |
| Antaron ™ WP 660 | 21% |
| Cellolyn ™ 21-E | 15% |
| Neopen Yellow 075 (example for dye) | 1% |

The invention has been described with reference to the preferred embodiments. Obviously, modifications and alterations will occur to others upon reading and understanding the proceeding detailed description. It is intended that the invention be construed as including all such modifications and alterations insofar as they come within the scope of the appended claims or the equivalents thereof.

I claim:

1. An abrasion-resistant and blocking-resistant hot melt ink adapted for ink jet printers, said hot melt ink comprising:
   a substance, solid at a room temperature, having a melting point in the range from about 30 to about 100° C., which imparts abrasion-resistance and scratch-resistance characteristics to said hot melt ink and being a copolymer of vinyl-pyrrolidone with one or several long-chain α-olefins with at least 10 carbon atoms;
   an adhesion-facilitating substance having a melting point of up to about 100° C.; and
   a viscosity-facilitating substance with a melting point of up to about 100° C. and, solid at room temperature.

2. The hot melt ink according to claim 1, wherein the long-chain α-olefin has 15 to 40 carbon atoms.

3. The hot melt ink according to claim 2 which comprises:
   10 to 75% by weight of a paraffin;
   4 to 30% by weight of the phthalate ester of hydroabietyl alcohol;
   10 to 75% by weight of Poly(1-ethenylpyrrolidon-2-on/triacont-1-en); and
   one of (i) 12 to 20% by weight pigment, and (ii) 0.5 to 5% by weight dye.

4. The hot melt ink according to claim 2 which comprises:
   about 63% by weight of a paraffin;
   about 15% by weight of the phthalate ester of hydroabietyl alcohol;
   about 21 % by weight of Poly(1-ethenylpyrrolidon-2-on/triacont-1-en); and
   one of (i) 1 to 3% by weight dye and (ii) 3 to 15% by weight of pigment;
   wherein the hot melt ink is adapted for printing at a temperature of 80° C. to 100° C.

5. The hot melt ink according to claim 1, wherein the long-chain α-olefin is eicosene.

6. The hot melt ink according to claim 1, wherein the copolymer of vinyl pyrrolidone is Poly(1-ethenylpyrrolidon-2-on/triacont-1-en).

7. The hot melt ink according to claim 1, wherein the adhesion-facilitating substance is a tacky, low-softening point resin having pigment-wetting characteristics.

8. The hot melt ink according to claim 7, wherein the tacky, low-softening point resin is a phthalate ester of technical hydroabietyl alcohol.

9. The hot melt ink of claim 7 wherein said resin has a softening point of from 55 to 75° C.

10. The hot melt ink according to claim 1, wherein said viscosity-facilitating substance is a wax.

11. The hot melt ink according to claim 10, wherein the wax is petroleum wax.

12. The hot melt ink according to claim 10, wherein the wax is paraffin.

13. The hot melt ink according to claim 1, wherein said ink has a melting point of about 80 to 100° C.

14. The hot melt ink according to claim 1, wherein said ink has a melting point of about 50 to 90° C.

15. The hot melt ink according to claim 1, wherein said ink comprises about 10 to about 75% by weight of said copolymer of vinyl pyrrolidone with one or several long-chain α-olefins.

16. The hot melt ink according to claim 1, wherein said ink comprises about 5 to about 30% by weight of said adhesion-facilitating substance.

17. The hot melt ink according to claim 1, wherein said ink comprises about 10 to about 75% by weight of said viscosity-facilitating substance.

18. The hot melt ink of claim 1, wherein said viscosity-facilitating substance is a wax-like substance.

* * * * *